Patented June 26, 1951

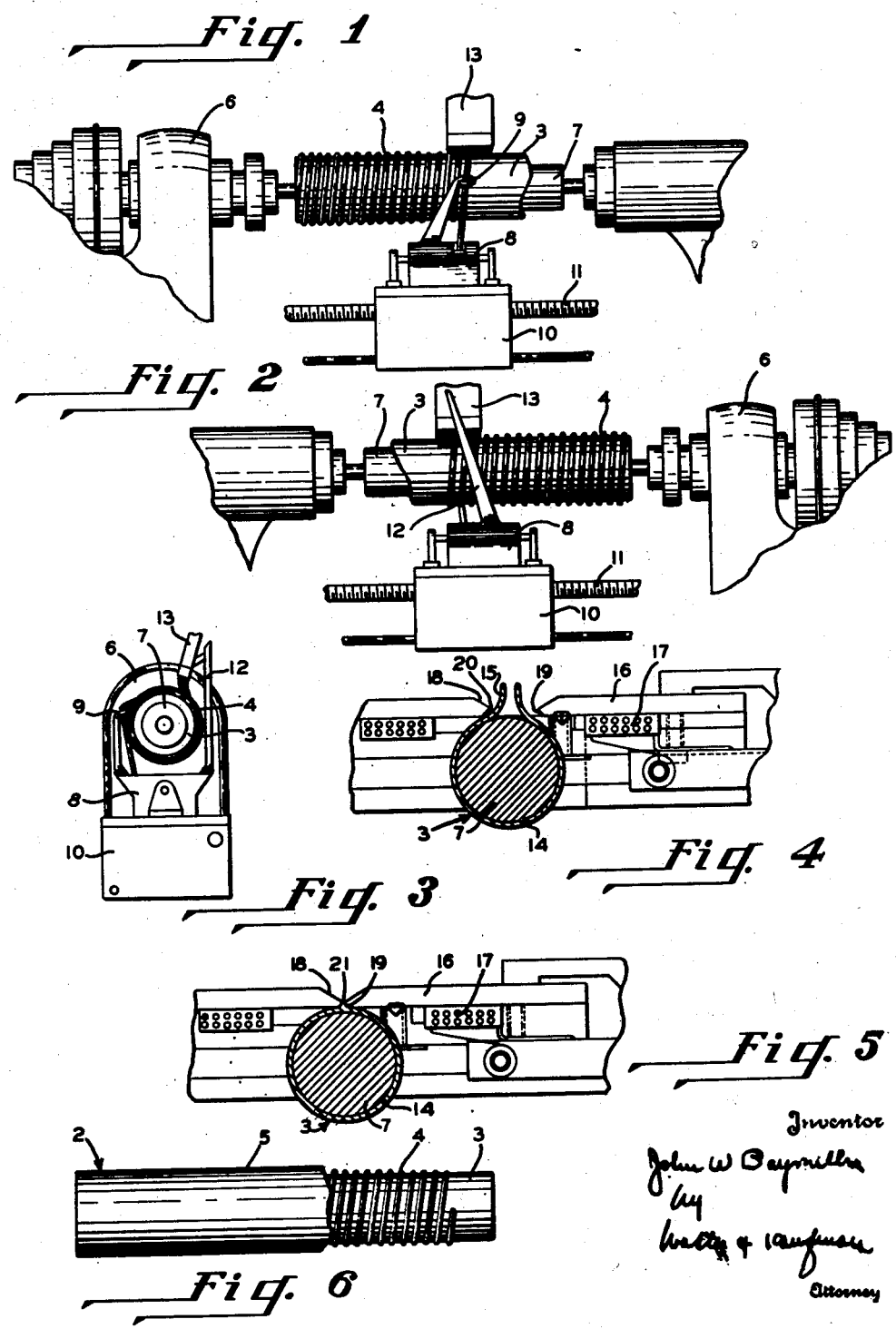

2,557,932

UNITED STATES PATENT OFFICE 2,557,932

METHOD OF MAKING TEXTILE UNITS FOR FIBER DRAFTING

John W. Baymiller, Manheim Township, Lancaster County, Pa., assignor to Armstrong Cork Company, Lancaster, Pa., a corporation of Pennsylvania Original application April 17, 1943, Serial No. 483,406. Divided and this application March 27, 1948, Serial No. 17,488. In Great Britain July 17, 1947

2 Claims. (Cl. 154—83)

This invention relates to textile units for fiber drafting and, more specifically, to a method of making long draft aprons for use in fiber drafting. Long or high draft systems for fiber drafting are well known, the two most commonly employed being the Whitin system and the Saco-Lowell Roth system. The use and function of long draft aprons in fiber drafting is described in Chapter IX of "American Cotton Handbook," copyright, 1941, by American Cotton Handbook Company. Such aprons include an inner layer adapted to resist wear caused by movement of the apron over flutings of the rolls on which it is mounted, a reinforcing and strengthening layer disposed thereover adapted to render the apron substantially inextensible in the direction of movement thereof and a flexible, resilient, wear-resistant exterior layer adapted to engage the fibers being drafted. The strengthening and reinforcing layer may be formed of a plurality of convolutions of twine disposed in spaced relationship about the inner layer. The term "twine" is used herein to denote strings, threads, cords, twists, small ropes, spun yarns or the like of cotton, silk, wool, nylon, glass fibers, rayon or other fibrous substances capable of being wound in tubular form. The interior and exterior layers may be composed of any suitable oil-resistant, flexible, resilient composition, for example, those synthetic rubber compositions commonly known as "elastomers."

The chief object of the present invention is to provide a method of making textile units for use in fiber drafting. An object is to provide a method of making long draft aprons which are substantially inextensible in the direction of movement. A further object is to provide a method of making resilient, flexible, wear-resistant aprons for use in long drafting which is economical, simple and easily practiced in commercial operation, and which produces an apron more satisfactory in use than those heretofore known in the industry. A still further object is to obviate the difficulties and disadvantages heretofore deemed inherent in the manufacture of long draft aprons. Other objects of my invention will be readily perceived from the following description.

This invention relates to a method of making textile machine units for use in fiber drafting in which the steps comprise disposing a resilient flexible sheet, such as a synthetic rubber sheet, about a mandrel with its ends overlapping to form a flap, severing the ends of the sheet, placing the severed edges in substantial abutment longitudinally of the mandrel, welding the severed edges together to form a tube disposed about the mandrel, softening the exterior surface of the tube by brushing a solvent thereon, embedding convolutions of twine in the softened surface, placing a wear-resistant layer preferably formed of synthetic rubber composition thereover, and securing said tube, twine and layer together to form an integral unit. Preferably, the twine convolutions are placed in spaced relationship and solvent is brushed thereon and on those portions of the tube exposed therebetween at the time solvent is applied generally to the tube. Such procedure places or brushes a coating formed from the softened exterior surface of the tube over the exterior surface of the twine, thus aiding in securing the layer, twine and tube together as a single unit. The layer, twine and tube are securely wrapped with fabric tape, wet with water, preferably, placed in an open steam vulcanizer and cured. Thereafter, the article may be removed from the mandrel, ground or buffed, and cut to size.

The attached drawing illustrates a preferred embodiment of my invention, in which Figure 1 is a diagrammatic view illustrating the step of forming the strengthening and reinforcing layer;

Figure 2 is a diagrammatic view illustrating the step of applying solvent to the tubular foundation and to the convolutions of twine;

Figure 3 is a view in end elevation of the apparatus shown in Figures 1 and 2;

Figures 4 and 5 are diagrammatic views illustrating the method of forming the tubular foundation; and Figure 6 is a view in elevation of a long draft apron constructed by the method of my invention, such apron being partially broken away to disclose the various layers.

Referring to the drawing, there is shown (Figure 6) a long draft apron designated generally at 2. Apron 2 comprises a tubular foundation 3 which may be formed of a synthetic rubber composition as hereinafter described, convolutions of twine wrapped thereabout to form a strengthening and reinforcing layer 4 and an exterior layer 5 of any suitable flexible, resilient, oil-resistant composition such as synthetic rubber disposed thereover and integrally united to the tubular foundation 3.

The strengthening and reinforcing layer 4 may be composed of a single length of twine wound helically with the convolutions of twine disposed in spaced relationship. If desired, a plurality of pieces of twine may be wound in one or more layers to form a strengthening and reinforcing tube. The convolutions of twine may be spaced a distance not greater than the thickness of the twine for best results; such twine may be composed of any material of suitable strength for the purpose intended. Cotton, silk, wool, rayon, flax, nylon or glass fibers are examples of satisfactory materials for my purpose. A typical example of satisfactory twine for this purpose is a cotton cord, size #36, four ply.

In Figures 1 to 5 inclusive there is illustrated suitable apparatus for carrying out the method of my invention. There is shown in Figures 1, 2 and 3 a lathe 6 of usual construction adapted to receive a mandrel 7 over which the tubular foundation 3 is disposed or formed in situ. A twine holder 8 contains a roll of twine which passes therefrom through an eyelet 9 to the tubular foundation 3 disposed over the mandrel 7. Holder 8 is mounted on a carriage 10 actuated by a lead screw 11 connected to the actuating mechanism (not shown) of the lathe 6. Carriage 10 carrying twine holder 8 is movable longitudinally of the lathe 6 and of the mandrel 7 and may be moved forward a distance equal to or slightly greater than the diameter of the twine being wound as each convolution is wound so that adjacent convolutions are spaced and are under slight tension. On the opposite side of holder 8 is placed a rod 12 adapted to carry a brush 13. The brush 13 is adapted to apply solvent to the exterior surface of the tubular foundation 3 and to several convolutions of twine wrapped thereabout, as shown in Figure 2. Solvent may be fed to the brush 13 by gravity from any suitable source of supply (not shown).

In Figures 4 and 5, there is illustrated diagrammatically apparatus for forming the tubular foundation 3 in situ. As shown therein, a resilient flexible wear-resistant sheet 14 which is of substantially uniform thickness and which eventually forms foundation 3 is disposed about the mandrel 7 in such manner that the free edges of the sheet are overlapped to form a flap 15 which projects radially of the mandrel 7. The portions which constitute the flap 15 are spaced from the surface of the mandrel 7 as shown in Figure 4. Knives or blades 16 are disposed in position to sever the flap 15. Knives 16 are heated by suitable grid heaters 17 for a purpose hereinafter described and are actuated in any suitable manner to move toward one another to apply pressure to the free edge portions of the sheet at the flap 15 to bring the sheet into complete engagement with the mandrel 7 as shown in Figure 5 and to sever the flap 15. The edges of the blades 16 are of somewhat unusual construction (refer to Figure 4). The edge of each blade extends downwardly and outwardly at about a 30° angle from a line drawn along the upper side of the blade to form a slanting surface 18 and then abruptly extends inwardly and downwardly to join the opposite side of the blade thus forming a similar surface 19. The juncture of surfaces 18 and 19 forms the severing edge 20 of the blade which in operation severs the free edge portions or flap 15 along a line disposed radially beyond the outer surface of the main portion of the sheet. When the blades are in closed position a triangular-like or wedge-shaped opening 21 is formed by the similar surfaces 19. The blades 16 are adapted to sever the flap 15 from the sheet 14 disposed about the mandrel and to place the severed edges of such sheet in substantial abutment longitudinally of the mandrel. The depth of the joint thus formed is greater than the thickness of the sheet 14 by the amount which the wedge-shaped portion projects about the main portion of the sheet as shown in Figure 4. The blades 16 heated by the grid heaters 17 serve to force the severed edges together and in effect weld the edges of the sheet to form the tube 3 disposed about the mandrel. By referring to Figures 4 and 5, it will be observed that at the line of juncture of the ends of the sheet 14 a slight ridge is formed as a result of the welding operation. This does not in any way interfere with the proper formation of the final product, but it does reinforce the joint.

This application is a division of my copending application, Serial No. 483,406, filed April 17, 1943, and entitled "Method of Making Textile Units for Fiber Drafting," now Patent No. 2,455,349. This application is directed particularly to that aspect of the invention which is concerned with the formation of the inner tubular foundation of a textile machine unit for drafting fibers.

I will now describe the preferred method of construction of the textile unit of my invention. Mandrel 7 is coated with a layer of any suitable mold lubricant such as a soap solution to facilitate removal of the finished tubular apron. Sheet 14 is then disposed about the mandrel 7 with its ends forming a flap 15 as best shown in Figure 4. The blades 16 are then actuated to sever or "pinch off" the flap 15 from the sheet disposed about the mandrel 7 and the severed edges of the sheet are placed in substantial abutment longitudinally of the mandrel by the blades 16. At the same time, the heated blades 16 force these severed edges together and heat them to weld one to the other, due to the peculiar construction of their edges. The joint so formed avoids any substantial roughness or unevenness in the foundation so formed which might be carried through to the surface layer and deleteriously affect the fiber being drawn.

The convolutions of twine 4 are then wrapped about the mandrel. Simultaneously, the brush 13 applies solvent to the exterior surface of the tube 3 in advance of the twine convolutions. The brush 13 is so disposed as also to apply the solvent to a number of the convolutions of twine 4 disposed about the tube 3 and to those portions of the tube 3 appearing between spaced convolutions of twine. The solvent softens the exterior surface of the tube 3 to permit the twine to be embedded therein; the brush 13 by the application of solvent to the twine 4 and to those portions of the tube 3 appearing between adjacent convolutions of twine brushes a coating formed from the composition of the tube on the exterior surface of the twine. By embedding the twine in the softened surface accurate spacing of the cord convolutions is secured and irregular spacing avoided since slipping is prevented. The embedding also permits the use of a thicker foundation thus increasing its wearing qualities without a substantial increase in the diameter of the finished apron. Heavier sheets to form the foundation are also easier to handle in the manufacturing operation.

Any suitable solvent may be used depending upon the type of synthetic rubber forming the composition. The solvent used may be, for example, monochlorobenzene, acetone or butyl-acetate. As pointed out above, the convolutions of twine are wound in spaced relationship about the tubular foundation 3. The angles formed by the convolutions with a line drawn axially of the tube are as close to 90° as possible in order to insure that the finished product is substantially inextensible radially. With the type of cord described above, I have found thirty-six convolutions per inch produces a satisfactory reinforcing layer.

The wear-resistant layer 5 is then applied over the strengthening and reinforcing twine layer 4. Layer 5 may be formed of the same composition as the tubular foundation 3 formed from sheet 14 or, if desired, of other composition so long as in the final product it possesses the properties of flexibility, resilience, oil-resistance and satisfactory resistance to wear. Layer 5 may be formed over the strengthening and reinforcing layer 4 in the manner described above for the formation of foundation 3. Preferably, wear-resistant layer 5 is in the form of a tube which is inflated and disposed over the strengthening and reinforcing layer 4. The combination of layers so formed is then wrapped tightly with wet fabric tape in order to obtain engagement of layer 5 with the twine 4 and the tube 3. Wrapping tightly the layer so formed with tape forces the outer layer to flow between the twine convolutions and also further embeds the twine convolutions in the foundation forcing the foundation layer to flow upwardly to some extent thus assuring engagement of the outer and inner layers. The article so formed is then vulcanized in an open steam vulcanizer by the application of steam for a period sufficient to cure the mass and to integrally unite the wear-resistant layer 5, twine 4 and tubular foundation 3; for example, 30 minutes at 300° F. will be generally satisfactory to obtain the required degree of vulcanization when synthetic rubbers such as "Hycar O. R.," "Perbunan," "Neoprene," or "Thiokol" are employed. The article so formed is then removed from the mandrel and its surface is ground or buffed to a desired diameter. The tubing is then severed to a desired length for use as long draft aprons.

The wear-resistant facing 5 and the tubular foundation 3 may be formed of a suitable synthetic rubber composition as shown in the following formula:

| | |
|---|---|
| Hycar O.R. _____parts by weight__ | 100.00 |
| Anti-oxidant _____do____ | 1.0 |
| Softeners _____do____ | 25.0 |
| Stearic acid _____do____ | 1.0 |
| Accelerator _____do____ | 1.5 |
| Reinforcing pigment _____do____ | 50.00 |
| Zinc oxide _____do____ | 5.0 |
| Sulfur _____do____ | 1.5 |

This mixture is suitably milled for the desired length of time and the milled mass formed into sheets of a required size suitable to dispose about a mandrel. The procedure involved in milling and sheeting of such masses is well-known and does not require further description.

In the above composition, "Hycar" ("Perbunan") is a synthetic rubber of the type known as a butadiene acrylic nitrile copolymer. Other synthetic rubbers may, of course, be employed in forming the wearing surface, for example "Thiokol" (olefine polysulfide), "Neoprene" (polymerized chloroprene), "Koroseal" (plasticized polyvinyl chloride), or similar copolymers containing a high content of chloride such as polyvinyl chloride-acetate copolymers or the like. Any of the materials of this character which possesses high resistance to oil, extreme flexibility, resilience, and the characteristic of being extremely resistant to cracking upon continued flexing over long periods of time may be substituted. Rubber may be used in some instances where the service does not require a high degree of oil resistance. The method employed in forming the aprons may be varied slightly depending upon the type of synthetic rubber employed; for example, "Koroseal" does not require vulcanization and aprons having wearing surfaces thereof need not be vulcanized. Articles so formed are substantially static-free under the conditions of humidity customarily employed in textile mills.

In the above described composition, any suitable anti-oxidants may be used. As softeners, I may use tricresyl phosphate, paraffin, dibutyl phthalate, pine tar, cumar, triacetin or the like. Accelerators are well-known in the art and mercaptobenzothiazole, tetramethylthiuramdisulfide, diphenylguanidine, zinc butyl xanthate, or combinations thereof, may be used. The reinforcing pigments and fillers included in this composition may include any of the various grades of carbon blacks, whitings, clays or the like. Zinc oxide is used in the composition primarily as an activator for the accelerators. Stearic acid is used as a plasticizer and aids in vulcanization. Sulfur, of course, is the vulcanizing agent. The ingredients and the amounts used may be varied as desired depending upon the properties desired in the final product.

My invention provides a method of making long draft aprons which is economical, simply and quickly practiced and which eliminates the disadvantages and difficulties heretofore involved in the manufacture of long draft aprons.

The long draft apron so provided is more satisfactory than any heretofore used in the industry for it is substantially inextensible radially, substantially static-free under the conditions of humidity customarily employed in textile mills, oil-resistant, flexible and resilient. Secure engagement between the outer layer, reinforcing layer and inner layer is obtained by the manufacturing process described above. My method prevents slippage of the twine during the winding or wrapping operation and assures regularity of the reinforcing layer.

While I have described and illustrated a preferred embodiment of my invention, it will be understood my invention is not so limited since it may be otherwise embodied within the scope of the following claims:

I claim:

1. In the fabrication of drafting aprons, the steps of: wrapping a sheet of flexible, resilient, wear-resistant material of substantially uniform thickness squarely about a mandrel with a coating of lubricant interposed between the sheet and mandrel and with the free edges of the sheet projecting radially from the mandrel; bringing the free edge portions of the sheet into abutting relationship; severing the free edge portions of the sheet extending above the portion of the sheet disposed in engagement with the mandrel to form a tube of substantially uniform thickness about the mandrel; and simultaneously with the severing step heating the joint where the free edges adjoin to weld the same into a unitary structure which may be removed from the mandrel.

2. In the fabrication of drafting aprons, the steps of: coating a mandrel with a lubricant; wrapping a sheet of flexible, resilient, wear-resistant material of substantially uniform thickness squarely about the lubricant-coated mandrel with the main portion of the sheet in engagement with the lubricant-coated mandrel and with the free edge portions of the sheet projecting radially in spaced relationship adjacent the surface of the mandrel; applying pressure to the free edge portions to bring the sheet into complete engagement with the mandrel; severing the free edge portions of the sheet extending above the main portion of the sheet disposed in engagement with the mandrel along a line disposed radially beyond the outer surface of the main portion of the sheet to form a joint, the depth of which is greater than the thickness of the sheet and is thus reinforced; and simultaneously with the severing step heating the joint to weld the same into a unitary tube of substantially uniform thickness disposed about the mandrel which may be removed from the mandrel.

JOHN W. BAYMILLER.

REFERENCES CITED

The following references are of record in the file of this patent:

UNITED STATES PATENTS

| Number | Name | Date |
|---|---|---|
| 652,975 | Newberry | July 3, 1900 |
| 2,145,941 | Maxfield | Feb. 7, 1939 |
| 2,157,732 | Piazze | May 9, 1939 |
| 2,220,545 | Reinhardt | Nov. 5, 1940 |
| 2,273,464 | Campbell et al. | Feb. 17, 1942 |
| 2,377,316 | Billmeyer | June 5, 1945 |
| 2,389,725 | Gillis et al. | Nov. 27, 1945 |
| 2,440,664 | Irons | Apr. 27, 1948 |